United States Patent
Zhevelev

(10) Patent No.: US 9,726,544 B2
(45) Date of Patent: Aug. 8, 2017

(54) METHOD AND SYSTEM FOR PASSIVE TRACKING OF MOVING OBJECTS

(71) Applicant: Tyco Fire & Security GmbH, Neuhausen am Rheinfall (CH)

(72) Inventor: Boris Zhevelev, Rishon-Le-Zion (IL)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 14/813,263

(22) Filed: Jul. 30, 2015

(65) Prior Publication Data

US 2016/0033334 A1    Feb. 4, 2016

Related U.S. Application Data

(60) Provisional application No. 62/030,754, filed on Jul. 30, 2014.

(51) Int. Cl.
*G01J 5/00* (2006.01)
*G08B 13/19* (2006.01)

(52) U.S. Cl.
CPC ............ *G01J 5/0025* (2013.01); *G08B 13/19* (2013.01)

(58) Field of Classification Search
CPC .................................................. G01J 5/0025
See application file for complete search history.

(56) References Cited

U.S. PATENT DOCUMENTS 5,641,963 A * 6/1997 Mueller ............... G08B 13/193
                                                                    250/342
7,573,032 B2    8/2009 Zhevelev et al.
7,705,310 B2    4/2010 Zhevelev et al.
(Continued)

FOREIGN PATENT DOCUMENTS

| | | |
|---|---|---|
| EP | 0402829 A2 | 12/1990 |
| EP | 1361553 A1 | 11/2003 |
| WO | 2016016900 A1 | 2/2016 |

OTHER PUBLICATIONS

International Search Report and Written Opinion of the International Searching Authority, mailed on Nov. 2, 2015, from International Application No. PCT/IL2015/050793, filed on Jul. 30, 2015. Ten pages.

(Continued)

*Primary Examiner* — Edwin Gunberg
(74) *Attorney, Agent, or Firm* — HoustonHogle LLP

(57) ABSTRACT

A system for detecting and tracking motion in a given area, including a first passive motion detection sensor operable for passively detecting motion in any of a first multiplicity of detection zones and, responsive thereto, for providing a first detection output signal including an indication of a first detection zone in which the motion was detected, a second passive motion detection sensor operable for passively detecting motion in any of a second multiplicity of detection zones, each of the second multiplicity of detection zones at least partially overlapping each of the first multiplicity of detection zones, and, responsive thereto, for providing a second detection output signal including an indication of a second detection zone in which the motion was detected, and a processor operable for receiving the first and second detection output signals and, responsive thereto, for providing an indication of a location of the motion.

16 Claims, 3 Drawing Sheets

(56) References Cited

U.S. PATENT DOCUMENTS

2002/0175996 A1  11/2002  Porter et al.
2002/0180636 A1  12/2002  Lin et al.
2013/0107245 A1   5/2013  Covaro

OTHER PUBLICATIONS

International Preliminary Report on Patentability, mailed Feb. 9, 2017, from International Application No. PCT/IL2015/050793, filed Jul. 30, 2015. Seven pages.

* cited by examiner

METHOD AND SYSTEM FOR PASSIVE TRACKING OF MOVING OBJECTS

REFERENCE TO RELATED APPLICATIONS

Reference is made to U.S. Provisional Patent Application Ser. No. 62/030,754, filed Jul. 30, 2014 and entitled "METHOD AND SYSTEM FOR PASSIVE TRACKING OF MOVING OBJECTS", the disclosure of which is hereby incorporated by reference and priority of which is hereby claimed pursuant to 37 CFR 1.78(a) (4) and (5)(i).

Reference is also made to the following patents and patent applications, owned by assignee, the disclosures of which are hereby incorporated by reference:

U.S. Pat. Nos. 7,573,032 and 7,705,310.

FIELD OF THE INVENTION

The present invention relates to systems and methods for passive motion detection and tracking.

BACKGROUND OF THE INVENTION

Passive motion detection systems are typically operable for sensing motion of an individual within a given area. However, these systems are typically not operable for ascertaining the exact location of the individual within the given area, and are typically not operable for tracking the path of the motion of the individual.

SUMMARY OF THE INVENTION

The present invention provides a system and method for passive motion detection and tracking.

There is thus provided in accordance with a preferred embodiment of the present invention a system for detecting and tracking motion in a given area, the system including a first passive motion detection sensor operable for passively detecting motion in any of a first multiplicity of detection zones and, responsive to the passively detecting motion in at least one of the first multiplicity of detection zones, for providing a first detection output signal including an indication of a first detection zone of the first multiplicity of detection zones in which the motion was detected, a second passive motion detection sensor operable for passively detecting motion in any of a second multiplicity of detection zones, each of the second multiplicity of detection zones at least partially overlapping each of the first multiplicity of detection zones, and, responsive to the passively detecting motion in at least one of the second multiplicity of detection zones, for providing a second detection output signal including an indication of a second detection zone of the second multiplicity of detection zones in which the motion was detected, and a processor operable for receiving the first and second detection output signals from the at least first and second passive motion detection sensors and, responsive thereto, for providing an indication of a location of the motion.

Preferably, at least one of the first and second passive motion detection sensors is a passive infrared (PIR) sensor. Preferably, the motion is of an infrared emitting entity. Preferably, the infrared emitting entity is a human.

Preferably, the first and second passive motion detection sensors are located at a fixed distance therebetween. Preferably, each of the first multiplicity of detection zones extends from the first passive motion detection sensor into a unique angular sector of the given area, and each of the second multiplicity of detection zones extends from the second passive motion detection sensor into a unique angular sector of the given area.

Preferably, the processor is operable for providing the indication of the location of the motion by employing a passive triangulation method of calculation to calculate an overlapping region of the first and second detection zones in which the motion was detected, the calculation being based at least on the first detection zone in which the motion was detected and a unique angle subtended by the unique angular sector of the given area into which the first detection zone extends from the first passive motion detection sensor, the second detection zone in which the motion was detected and a unique angle subtended by the unique angular sector of the given area into which the second detection zone extends from the second passive motion detection sensor, and the fixed distance between the first and second passive motion detection sensors.

Preferably, the first and second passive motion detection sensors are mounted on at least one wall of the given area. Alternatively, the first and second passive motion detection sensors are mounted on a ceiling of the given area.

Preferably, the processor is also operable for recording the location of the detected motion over time, thereby being operable for tracking a path of the motion over time.

There is also provided in accordance with another preferred embodiment of the present invention a method for detecting and tracking motion in a given area, the method including passively detecting motion in any of a first multiplicity of detection zones by employing a first passive motion detection sensor and, responsive thereto, providing a first detection output signal including an indication of a first detection zone of the first multiplicity of detection zones in which the motion was detected, passively detecting motion in any of a second multiplicity of detection zones by employing a second passive motion detection sensor, each of the second multiplicity of detection zones at least partially overlapping each of the first multiplicity of detection zones, and, responsive thereto, providing a second detection output signal including an indication of a second detection zone of the second multiplicity of detection zones in which the motion was detected, and receiving the first and second detection output signals and, responsive thereto, providing an indication of a location of the motion.

Preferably, at least one of the first and second passive motion detection sensors is a passive infrared (PIR) sensor. Preferably, the motion is of an infrared emitting entity. Preferably, the infrared emitting entity is a human.

Preferably, the first and second passive motion detection sensors are located at a fixed distance therebetween. Preferably, each of the first multiplicity of detection zones extends from the first passive motion detection sensor into a unique angular sector of the given area, and each of the second multiplicity of detection zones extends from the second passive motion detection sensor into a unique angular sector of the given area.

Preferably, providing the indication of the location of the motion is achieved by employing a passive triangulation method of calculation to calculate an overlapping region of the first and second detection zones in which the motion was detected, the calculation being based at least on the first detection zone in which the motion was detected and a unique angle subtended by the unique angular sector of the given area into which the first detection zone extends from the first passive motion detection sensor, the second detection zone in which the motion was detected and a unique angle subtended by the unique angular sector of the given area into which the second detection zone extends from the second passive motion detection sensor, and the fixed distance between the first and second passive motion detection sensors.

Preferably, the first and second passive motion detection sensors are mounted on at least one wall of the given area. Alternatively, the first and second passive motion detection sensors are mounted on a ceiling of the given area.

Preferably, the method also includes recording the location of the detected motion over time, thereby tracking a path of the motion over time.

BRIEF DESCRIPTION OF THE DRAWINGS

The present invention will be understood and appreciated more fully from the following detailed description in which.

DETAILED DESCRIPTION OF PREFERRED EMBODIMENTS

Figure 1A:
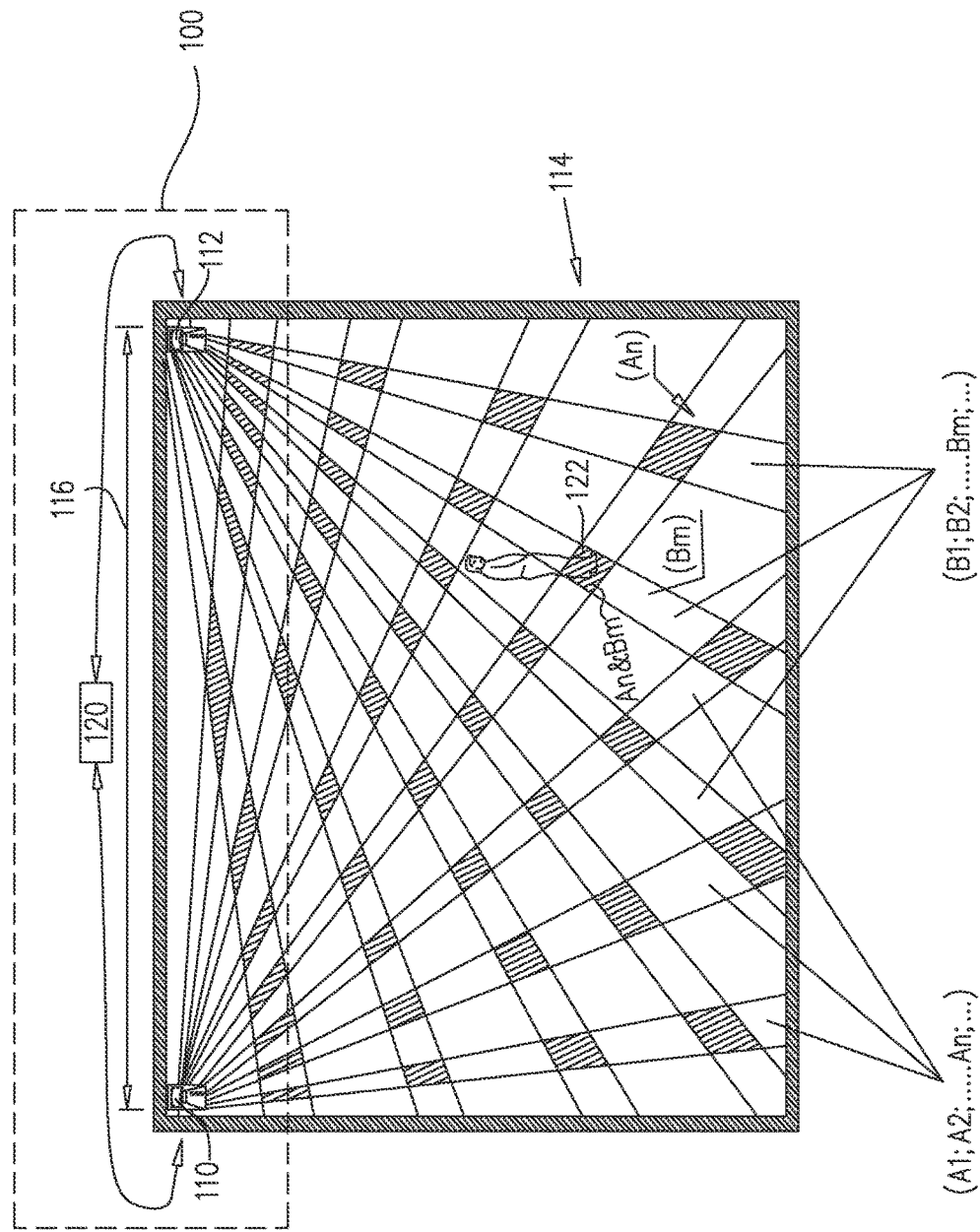
FIG. 1A is a simplified pictorial illustration of a motion detection system, constructed and operative in accordance with a preferred embodiment of the present invention.
Figure 1B:
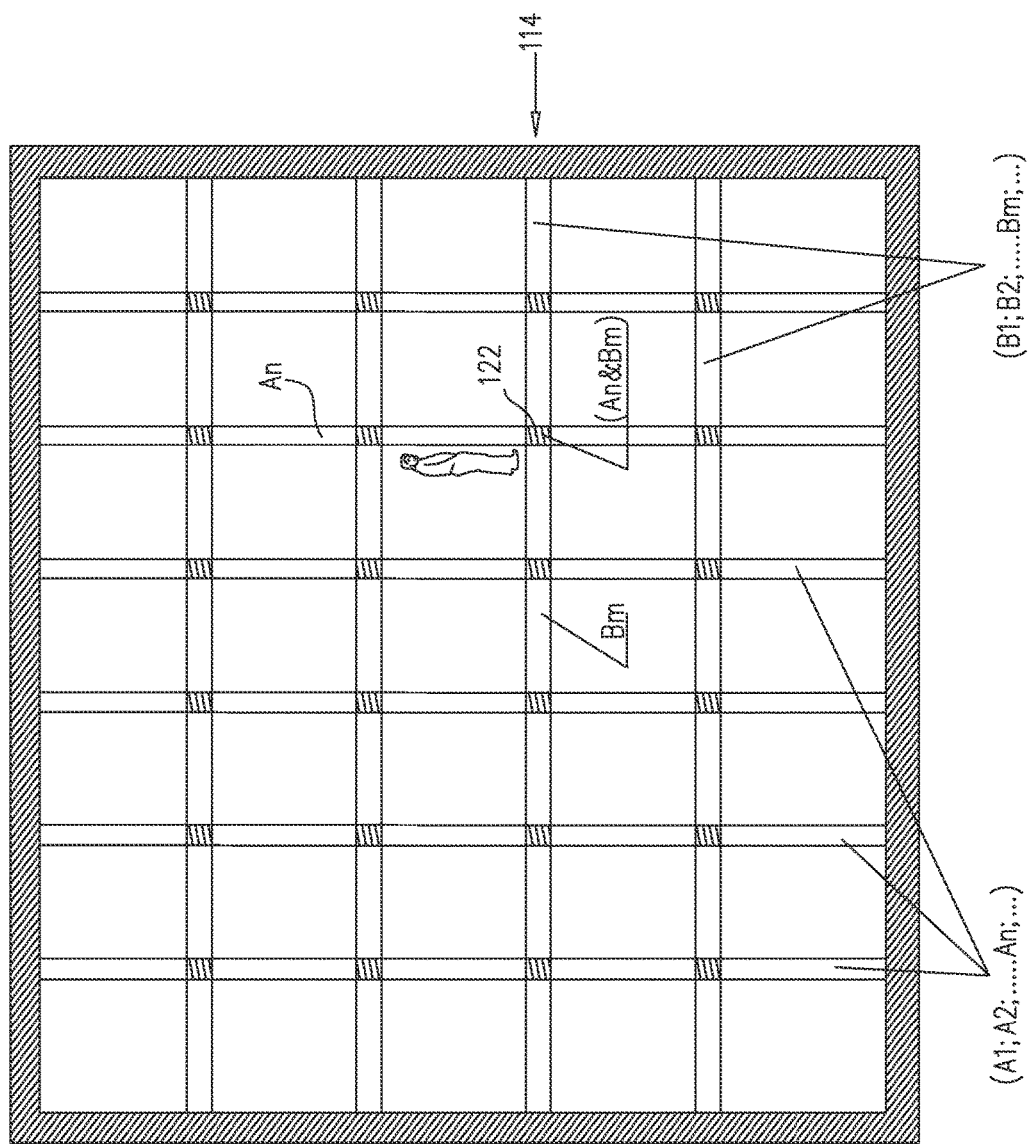
FIG. 1B is a simplified pictorial illustration of a detection pattern of the motion detection system, constructed and operative in accordance with an alternative embodiment of the present invention.

Reference is now made to FIG. 1A, which is a simplified pictorial illustration of a motion detection system, constructed and operative in accordance with a preferred embodiment of the present invention, and to FIG. 1B, which is a simplified pictorial illustration of a detection pattern of the motion detection system, constructed and operative in accordance with an alternative embodiment of the present invention. The system of the present invention preferably includes:

a first passive motion detection sensor operable for passively detecting motion in any of a first multiplicity of detection zones and, responsive to detecting motion in at least one of the first multiplicity of detection zones, for providing a first detection output signal including an indication of a first detection zone of the first of detection zones in which the motion was detected;

a second passive motion detection sensor operable for passively detecting motion in any of a second multiplicity of detection zones, each of the second multiplicity of detection zones at least partially overlapping each of the first multiplicity of detection zones, and, responsive to detecting motion in at least one of the second multiplicity of detection zones, for providing a second detection output signal including an indication of a second detection zone of the second multiplicity of detection zones in which the motion was detected; and a processor operable for receiving the first and second detection output signals from the at least first and second passive motion detection sensors and, responsive thereto, for providing an indication of the location of the motion.

It is appreciated that the first and second passive motion detection sensors are preferably located at a fixed distance therebetween. It is further appreciated that each of the first multiplicity of detection zones extends from the first passive motion detection sensor into a unique angular sector of the given area, and each of the second multiplicity of detection zones extends from the second passive motion detection sensor into a unique angular sector of the given area.

It is a particular feature of the present invention that the processor is operable for providing an indication of the location of the motion by employing a passive triangulation method of calculation to calculate an overlapping region of the first and second detection zones in which the motion was detected, the calculation being based at least on:

the first detection zone in which the motion was detected and a unique angle subtended by the unique angular sector of the given area into which the first detection zone extends from the first passive motion detection sensor;

the second detection zone in which the motion was detected and a unique angle subtended by the unique angular sector of the given area into which the second detection zone extends from the second passive motion detection sensor; and the fixed distance between the first and second passive motion detection sensors.

As shown in FIG. 1A, motion detection system 100 of the present invention includes passive motion detection sensors 110 and 112 mounted on the walls of a room 114 and positioned at a distance 116 therebetween. Passive motion detection sensor 110 is preferably operable for monitoring and passively detecting motion in any of detection zones $(A_1, A_2, \ldots A_n \ldots)$, each of detection zones $(A_1, A_2, \ldots A_n \ldots)$ extending into room 114 from sensor 110 into a unique angular sector of room 114. Passive motion detection sensor 112 is preferably operable for monitoring and passively detecting motion in any of detection zones $(B_1, B_2, \ldots B_m \ldots)$, each of detection zones $(B_1, B_2, \ldots B_m \ldots)$ extending into room 114 from sensor 112 into a unique angular sector of room 114. As clearly shown in FIG. 1A, each of detection zones $(A_1, A_2, \ldots, A_n \ldots)$ at least partially overlaps each of detection zones $(B_1, B_2, \ldots B_m \ldots)$.

As an individual moves across an area of room 114 monitored by passive motion detection sensors 110 and 112, each of passive motion detection sensors 110 and 112 preferably detects the motion as occurring within at least one of the detection zones monitored thereby. As shown in FIG. 1A, individual 120 is located in detection zone $A_n$ monitored by passive motion detection sensor 110 and in overlapping detection zone $B_m$ monitored by passive motion detection sensor 112. Each of passive motion detection sensors 110 and 112 is operable for providing a detection output signal including a detection zone indication of the detection zone in which the motion was detected.

A processor 120 is provided for communicating with each of passive motion detection sensors 110 and 112 and for receiving the detection output signals from each of passive motion detection sensors 110 and 112. It is a particular feature of the present invention that processor 120 is operable for employing a passive triangulation method of calculation to calculate the location of the detected motion. The calculation is preferably based on the indicated detection zones included in the detection output signals, in conjunction with distance 116 between passive motion detection sensors 110 and 112 and the angles subtended by each of the indicated detection zones. In the example of FIG. 1A, the location of the detected motion is calculated to be a region 122 comprising the overlapping regions of detection zone $A_n$ defined by sensor 110 and detection zone $B_m$ defined by sensor 112. It is appreciated that by recording the location of the detected motion over time, system 100 is operable for tracking a path of the motion over time.

Alternatively, as shown in FIG. 1B, passive motion detection sensors may be mounted on the ceiling of room 114, whereby detection zones $(A_1, A_2, \ldots A_n \ldots)$ preferably extend downward to the floor of room 114 from a first sensor into a unique angular sector of room 114 and detection zones ($B_1, B_2, \ldots B_m \ldots$) preferably extend downward to the floor of room 114 from a second sensor into a unique angular sector of room 114. As clearly shown in FIG. 1B, each of detection zones ($A_1, A_2, \ldots A_n \ldots$) at least partially overlaps each of detection zones ($B_1, B_2, \ldots B_m \ldots$).

Figure 2:
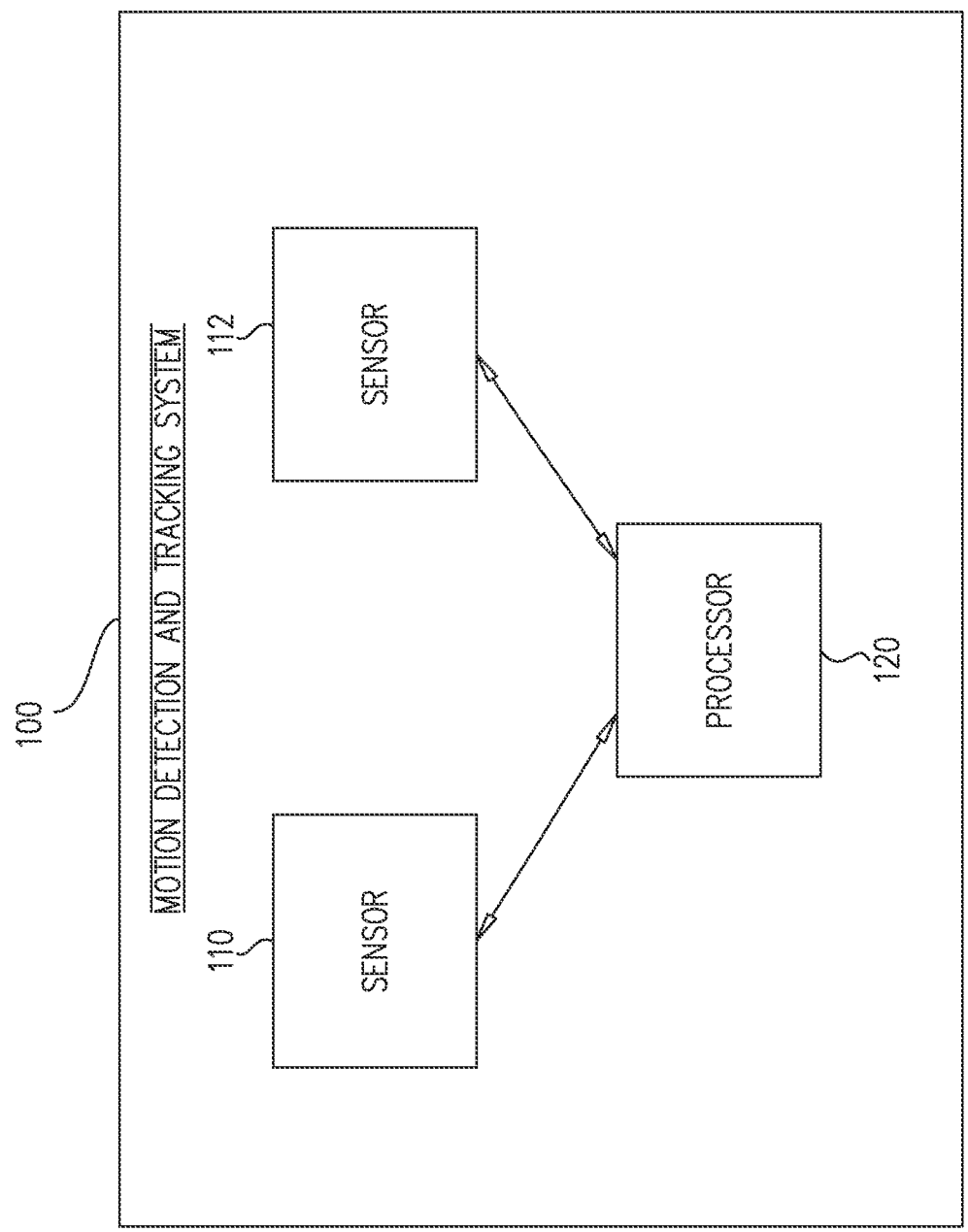
FIG. 2 is a simplified block diagram illustration of the system of FIGS. 1A and 1B.

Reference is now made to FIG. 2, which is a simplified block diagram illustration of the motion detection system for detecting motion in a given area of FIGS. 1A and 1B.

As shown in FIG. 2 and as described hereinabove, the system for detecting and tracking motion 100 of FIGS. 1A and 1B preferably includes first passive motion detection sensor 110 operable for passively detecting motion in any of a first multiplicity of detection zones and, responsive to detecting motion in at least one of the first multiplicity of detection zones, for providing a first detection output signal comprising an indication of a first detection zone of the first multiplicity of detection zones in which the motion was detected. Sensor 110 may be, for example, a passive infrared (PIR) sensor.

System 100 also preferably includes second passive motion detection sensor 112 operable for passively detecting motion in any of a second multiplicity of detection zones, each of the second multiplicity of detection zones at least partially overlapping each of the first multiplicity of detection zones, and, responsive to detecting motion in at least one of the second multiplicity of detection zones, for providing a second detection output signal comprising an indication of a second detection zone of the second multiplicity of detection zones in which the motion was detected. Sensor 112 may be, for example, a passive infrared (PIR) sensor.

System 100 also preferably includes processor 120 operable for receiving the first and second detection output signals from the at least first and second passive motion detection sensors and, responsive thereto, for providing an indication of the location of the motion.

As described hereinabove, it is appreciated that first and second passive motion detection sensors 110 and 112 are preferably located at a fixed distance therebetween. It is further appreciated that each of the first multiplicity of detection zones extends from first passive motion detection sensor 110 into a unique angular sector of the given area, and each of the second multiplicity of detection zones extends from second passive motion detection sensor 112 into a unique angular sector of the given area.

It is a particular feature of the present invention that processor 120 is operable for providing an indication of the location of the motion by employing a passive triangulation method of calculation to calculate an overlapping region of the first and second detection zones in which the motion was detected, the calculation being based at least on:

the first detection zone in which the motion was detected and a unique angle subtended by the unique angular sector of the given area into which the first detection zone extends from first passive motion detection sensor 110;

the second detection zone in which the motion was detected and a unique angle subtended by the unique angular sector of the given area into which the second detection zone extends from second passive motion detection sensor 112; and the fixed distance between first and second passive motion detection sensors 110 and 112.

It will be appreciated by persons skilled in the art that the present invention is not limited by what has been particularly shown and described hereinabove. Rather the scope of the present invention includes both combinations and subcombinations of the various features described hereinabove as welt as modifications thereof which would occur to persons skilled in the art upon reading the foregoing description and which are not in the prior art.

The invention claimed is:

1. A system for detecting and tracking motion in a given area, said system comprising:

a first passive motion detection sensor, mounted on a ceiling of said given area, operable for passively detecting motion in any of a first multiplicity of detection zones, each of said first multiplicity of detection zones being arranged along a corresponding one of a first multiplicity of mutually parallel axis, and, responsive to said passively detecting motion in at least one of said first multiplicity of detection zones, for providing a first detection output signal comprising an indication of a first detection zone of said first multiplicity of detection zones in which said motion was detected;

a second passive motion detection sensor, mounted on said ceiling of said given area, operable for passively detecting motion in any of a second multiplicity of detection zones, each of said second multiplicity of detection zones at least partially overlapping each of said first multiplicity of detection zones, each of said second multiplicity of detection zones being arranged along a corresponding one of a second multiplicity of mutually parallel axes, each of said second multiplicity of mutually parallel axes being orthogonal to each of said first multiplicity of mutually parallel axis, and, responsive to said passively detecting motion in at least one of said second multiplicity of detection zones, for providing a second detection output signal comprising an indication of a second detection zone of said second multiplicity of detection zones in which said motion was detected; and a processor operable for receiving said first and second detection output signals comprising corresponding indications of said first and second detection zones arranged along said mutually orthogonal axis from said at least first and second passive motion detection sensors and, responsive thereto, for providing an indication of an overlapping region of said first and second detection zones in which said motion was detected, obviating the need for employing a passive triangulation method of calculation to calculate said overlapping region of said first and second detection zones in which said motion was detected.

2. A system for detecting and tracking motion in a given area according to claim 1 and wherein at least one of said first and second passive motion detection sensors is a passive infrared (PIR) sensor.

3. A system for detecting and tracking motion in a given area according to claim 1 and wherein said motion is of an infrared emitting entity.

4. A system for detecting and tracking motion in a given area according to claim 3 and wherein said infrared emitting entity is a human.

5. A system for detecting and tracking motion in a given area according to claim 1 and wherein said first and second passive motion detection sensors are located at a fixed distance therebetween.

6. A system for detecting and tracking motion in a given area according to claim 5 and wherein each of said first multiplicity of detection zones extends from said first passive motion detection sensor into a unique angular sector of said given area, and each of said second multiplicity of detection zones extends from said second passive motion detection sensor into a unique angular sector of said given area.

7. A system for detecting and tracking motion in a given area according to claim 6 and wherein said processor is operable for providing said indication of said location of said motion by employing a passive triangulation method of calculation to calculate an overlapping region of said first and second detection zones in which said motion was detected, said calculation being based at least on:
   said first detection zone in which said motion was detected and a unique angle subtended by said unique angular sector of said given area into which said first detection zone extends from said first passive motion detection sensor;
   said second detection zone in which said motion was detected and a unique angle subtended by said unique angular sector of said given area into which said second detection zone extends from said second passive motion detection sensor; and
   said fixed distance between said first and second passive motion detection sensors.

8. A system for detecting and tracking motion in a given area according to claim 1 and wherein said processor is also operable for recording said location of said detected motion over time, thereby being operable for tracking a path of said motion over time.

9. A method for detecting and tracking motion in a given area, said method comprising:
   passively detecting motion in any of a first multiplicity of detection zones, each of said first multiplicity of detection zones being arranged along a corresponding one of a first multiplicity of mutually parallel axis, by employing a first passive motion detection sensor mounted on a ceiling of said given area and, responsive thereto, providing a first detection output signal comprising an indication of a first detection zone of said first multiplicity of detection zones in which said motion was detected;
   passively detecting motion in any of a second multiplicity of detection zones by employing a second passive motion detection sensor mounted on said ceiling of said given area, each of said second multiplicity of detection zones at least partially overlapping each of said first multiplicity of detection zones, each of said second multiplicity of detection zones being arranged along a corresponding one of a second multiplicity of mutually parallel axes, each of said second multiplicity of mutually parallel axes being orthogonal to each of said first multiplicity of mutually parallel axis, and, responsive thereto, providing a second detection output signal comprising an indication of a second detection zone of said second multiplicity of detection zones in which said motion was detected; and
   receiving said first and second detection output signals comprising corresponding indications of said first and second detection zones arranged along said mutually orthogonal axis and, responsive thereto, providing an indication of an overlapping region of said first and second detection zones in which said motion was detected, obviating the need for employing a passive triangulation method of calculation to calculate said overlapping region of said first and second detection zones in which said motion was detected.

10. A method for detecting and tracking motion in a given area according to claim 9 and wherein at least one of said first and second passive motion detection sensors is a passive infrared (PIR) sensor.

11. A method for detecting and tracking motion in a given area according to claim 9 and wherein said motion is of an infrared emitting entity.

12. A method for detecting and tracking motion in a given area according to claim 11 and wherein said infrared emitting entity is a human.

13. A method for detecting and tracking motion in a given area according to claim 9 and wherein said first and second passive motion detection sensors are located at a fixed distance therebetween.

14. A method for detecting and tracking motion in a given area according to claim 13 and wherein each of said first multiplicity of detection zones extends from said first passive motion detection sensor into a unique angular sector of said given area, and each of said second multiplicity of detection zones extends from said second passive motion detection sensor into a unique angular sector of said given area.

15. A method for detecting and tracking motion in a given area according to claim 14 and wherein said providing said indication of said location of said motion is achieved by employing a passive triangulation method of calculation to calculate an overlapping region of said first and second detection zones in which said motion was detected, said calculation being based at least on:
   said first detection zone in which said motion was detected and a unique angle subtended by said unique angular sector of said given area into which said first detection zone extends from said first passive motion detection sensor;
   said second detection zone in which said motion was detected and a unique angle subtended by said unique angular sector of said given area into which said second detection zone extends from said second passive motion detection sensor; and
   said fixed distance between said first and second passive motion detection sensors.

16. A method for detecting and tracking motion in a given area according to claim 9 and also comprising recording said location of said detected motion over time, thereby tracking a path of said motion over time.

* * * * *